(12) United States Patent
Alam et al.

(10) Patent No.: US 7,363,238 B2
(45) Date of Patent: *Apr. 22, 2008

(54) METHOD AND SYSTEM FOR COST INTEGRATION IN A FLEXIBLE ORDER TRANSACTION SYSTEM

(75) Inventors: Muhammad M. Alam, Santa Clara, CA (US); Ruediger Meyfarth, Heidelberg (DE); Sam S. Hwang, Los Altos, CA (US); Rama Koti R. Konatham, Sunnyvale, CA (US); Gaurav Sharma, San Jose, CA (US)

(73) Assignee: SAP AG, Walldorf (DE)

( * ) Notice: Subject to any disclaimer, the term of this patent is extended or adjusted under 35 U.S.C. 154(b) by 760 days.

This patent is subject to a terminal disclaimer.

(21) Appl. No.: 10/851,275

(22) Filed: May 21, 2004

(65) Prior Publication Data

US 2005/0261924 A1  Nov. 24, 2005

(51) Int. Cl.
- *G06Q 10/00* (2006.01)
- *G06Q 30/00* (2006.01)
- *G06F 17/50* (2006.01)
- *G06F 17/00* (2006.01)

(52) U.S. Cl. .............................. 705/1; 705/26; 705/29; 705/400; 705/500

(58) Field of Classification Search .................. 705/10, 705/11, 26, 7, 27, 400, 1, 500, 29; 707/E17.012
See application file for complete search history.

(56) References Cited

U.S. PATENT DOCUMENTS

| | | | |
|---|---|---|---|
| 6,023,683 A | 2/2000 | Johnson et al. | |
| 2001/0027447 A1* | 10/2001 | Matsuura | 705/400 |
| 2002/0069103 A1* | 6/2002 | Puri et al. | 705/11 |
| 2002/0077979 A1 | 6/2002 | Nagata | |
| 2002/0099585 A1* | 7/2002 | Locke | 705/7 |
| 2004/0143488 A1* | 7/2004 | Wang | 705/10 |
| 2005/0131779 A1 | 6/2005 | Kitamura et al. | |

FOREIGN PATENT DOCUMENTS

JP  2001154722 A  6/2001

* cited by examiner

*Primary Examiner*—Yogesh C Garg
(74) *Attorney, Agent, or Firm*—Kenyon & Kenyon LLP

(57) ABSTRACT

A method and system for integrating cost when an order is changed and the order is currently in production using a flexible order transaction system involving the detailed mapping of the costs to the yield and scrap that are transferred as a result of the change in the order. The transfer from the original order to the new order occurs at several mapped reporting points as a result of the order change.

22 Claims, 9 Drawing Sheets

METHOD AND SYSTEM FOR COST INTEGRATION IN A FLEXIBLE ORDER TRANSACTION SYSTEM

RELATED APPLICATIONS

This application incorporates by reference the following pending applications in their entirety: Method And System For Splitting An Order In A Flexible Order Transaction System (11884/416501), Patent Application No. not yet assigned, filed 21 May 2003; Method And System For Changing An Order In A Flexible Order Transaction System (11884/416701), Patent Application No. not yet assigned, filed 21 May 2003; Method And System For Merging Orders In A Flexible Order Transaction System (11884/416801), Patent Application No. not yet assigned, filed 21 May 2003; and Control System Interface for Flexible Order Transaction (11884/416601), Patent Application No. not yet assigned, filed 21 May 2003.

FIELD OF THE INVENTION

The present invention relates to a method and system for cost integration in a flexible order transaction system. In one embodiment of the present invention, the flexible order system relates to a shop floor manufacturing system controlling already in progress production orders.

BACKGROUND

In conventional flexible order transaction systems in manufacturing, functionality allowing the flexible splitting of orders, merging of orders, and changing of orders all involve the transfer of cost between the orders. For example, if an order, Order_A, is split into three orders—Order_A (with new quantities), Order_B, and Order_C—the costs incurred for the production of the transferred products, component usage, and resource usage up to the point they were transferred from the parent order (Order_A) to the new child orders (Order_B and Order_C) also needs to be transferred. In conventional flexible order transaction systems, the transfer of these costs is often made using a standard cost or standard value for the units transferred and not by using the actual cost for the units transferred. Standard costs and standard values are generally calculated across the entire process and do not accurately reflect particular operations in the production process. Additionally, standard costs and values are often estimated and do not reflect the actual cost incurred. When successfully and unsuccessfully produced units along the process are transferred to another order as a result of the change, the accurate transfer of the associated resource and component usage and costs is extremely beneficial. Unfortunately, many conventional system are limited in how accurately they transfer cost.

SUMMARY

In one embodiment of the present invention, a method for cost integration for a change in an order in a flexible order transaction system where production of the order is currently in progress allows resource and component usage and cost to be transferred at multiple points in the manufacturing process overcoming some of the limitations of conventional systems. According to one embodiment, a request for a product change transaction, a split order transaction, and a merge orders transaction may result in the transfer of production between orders. Additionally, they may result in the generation of a new order. In all these circumstances, the accurate transfer and integration of cost including the component and resource usage is desirable. In one embodiment of the present invention, the resource usage and component usage is associated with the yield (i.e., successfully processed units) and scrap (i.e., the unsuccessfully processed units that can't be reworked) and transferred along with the yield and scrap to accurately track and distribute the cost of production. At each reporting point in the process for the original transferring order, the quantity of successfully processed product (i.e., the yield) and the quantity of unsuccessfully processed product that cannot be reprocessed (i.e., the scrap) are determined. The resource and component usage is also determined at the reporting point and may be allocated to the yield and scrap. In one embodiment of the present invention, as yield and scrap are transferred, the associated resource and component usage from which costs are determined are also transferred. In another embodiment of the present invention, the actual costs are transferred along with the resource and component usage. Estimated remaining resource and component requirements may also be transferred in another embodiment of the present invention. The reporting points in the original order are mapped to reporting points in the new order and the resource and component usage and/or cost at each mapped reporting point in the original order is transferred to the corresponding mapped reporting point in the receiving order along with the transfer of yield and scrap. The unmapped resource and component usage and cost may be transferred with unmapped yield and scrap using the mapping at the first preceding (i.e., first earlier) mapped reporting point in the original order in one embodiment of the present invention. In another embodiment, the unmapped resource and component usage and cost may be transferred with unmapped yield and scrap using the mapping at the first subsequent mapped reporting point in the original order. The present invention allows the transferring of resource and component usage and costs to occur at multiple reporting points in a single transaction changing an order. For example, using the SAP® Flexible Order Transaction in the Advanced Planning and Optimization (APO), resource and component usage and costs may be transferred across multiple reporting points from an original, transferring order to a receiving order. The mapping between the process associated with the original order and the process associated with the new order may already exist in a mapping table of the flexible order transaction system or may be specified during the request to change the order in separate embodiments of the present invention. Even where a user specifies mapping, the user does not have to specify all the mapping between reporting points in the original and new orders as may be required in conventional systems. Additionally, detail mapping does not need to be provided when a change in the order occurs. For example, where to transfer unmapped resource and component usage and costs (along with scrap and work-in-process) from the original order to the new order can be automatically determined by the system by using a "soft up" approach where the unmapped quantities may be transferred at the first preceding mapped reporting point in one embodiment of the present invention. In another embodiment, under these same circumstances, unmapped resource and component usage and costs may be transferred at the next subsequent mapped reporting point using a "soft down" approach.

DETAILED DESCRIPTION

In a flexible order transaction system, the transfer of actual costs when a alteration to an order is made (e.g., split order, merge orders, product change) can be made through the transferring of costs between several reporting points in the production process for the orders according to one embodiment of the present invention. In an embodiment where an original order is deleted and new orders generated (e.g., possible with split order transactions, merge orders transactions, and product change transactions), all the accumulated actual costs and remaining requirements may be transferred to the new orders. In an alternative embodiment where only a portion of the production from an existing order is transferred to another order, only the accumulated actual costs and remaining requirements for the production that is transferred to the other order is also transferred. Where the difference between the orders involves a different structure and processing (i.e., process structure) as compared to the existing order, component and resource requirements for the remaining production may and, most likely will, change though there will be no impact on the actual costs accumulated up to the transfer. The processing or process structure is the actual work (i.e., processing) performed on the production inputs (i.e., the components) using the process resources (i.e., resources) to transform a product from components at the start of the process to a final product according to one embodiment of the present invention. The actual work (i.e., the processing or process structure) that is performed may differ between the existing or transferring order and the receiving order or may share the same process structure. If the process structure of the receiving order is different from the transferring order, mapping between the processes as discussed in applications incorporated by reference may be necessary.

Figure 1:
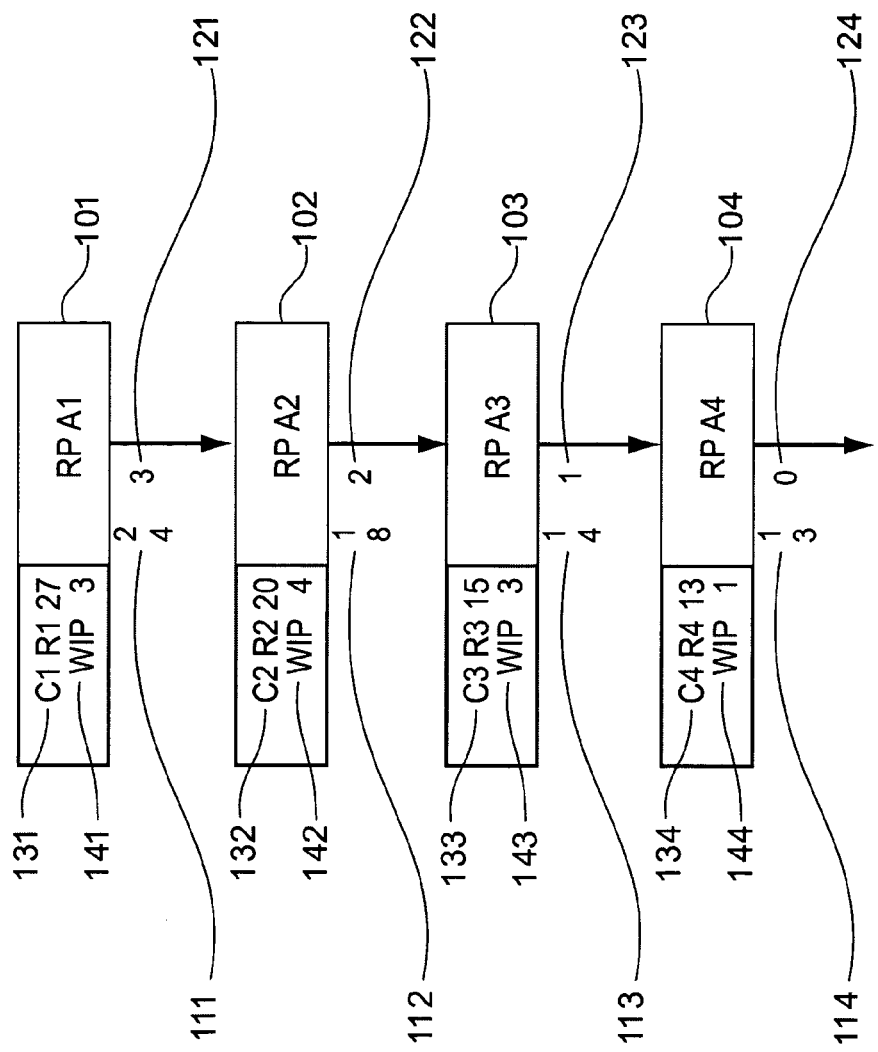
FIG. 1 is a diagram illustrating the processing of an example production order before any transfer of production occurs according to one embodiment of the present invention.

FIG. 1 is a diagram illustrating the processing of an example production order before any transfer of production occurs according to one embodiment of the present invention. The example embodiment shown in FIG. 1 depicts an order, Order_A, 100 for the production of 30 units of a product. A production process, according to one embodiment of the present invention, is the process needed to convert inputs (e.g., components and resources) into a product or to modify a manufactured item in order to produce a desired finished product. The inputs into the production process can be considered components, the physical items required to produce the product, and resources, the labor, machinery, and other services required to produce the product. In the example embodiment shown in FIG. 1, a production process may be divided in several discrete steps representing particularly distinct or distinguishable portions of the process at the conclusion of which an accurate accounting of the progress of an order may be made. A reporting point (RP) is the conclusion of one of these portions or steps in the production process and at which the status of the order may be confirmed. The order status may be determined by any conventional means including manual and automated reporting on order status. In the embodiment shown in FIG. 1, the production process associated with Order_A 100 includes four reporting points (RP): RP A1 101, RP A2 102, RP A3 103, and RP A4 104.

At each reporting point (RP), the inputs for the product are consumed as part of the shop floor production process according to one embodiment of the present invention. At each reporting point, a unit of the product is either successfully processed—ending up as "yield"—or is unsuccessfully processed—ending up as "scrap". Yield is the quantity of the product that has already been processed at an activity level reported on at the reporting point. Scrap is the quantity that at a given activity level (reporting point) will no longer be further processed. The remaining quantity still undergoing processing or still waiting for processing to initiate for the reporting point (RP) is considered the Work-in-Process (WIP) quantity. According to one embodiment of the present invention, if an unsuccessfully processed unit of the product can be reprocessed, it is considered WIP instead of scrap, which can't be reprocessed. In other words, according to this embodiment, an unsuccessfully processed unit of product at a reporting point is considered scrap if it can't be reprocessed while, if it can be reprocessed, it is considered WIP and eventually reprocessed-scrap is not salvageable.

At each reporting point, the quantity of yield, scrap, and WIP equal the yield from the preceding reporting point according to one embodiment of the present invention. At the first reporting point, the quantities of yield, scrap, and WIP equal the order quantity according to this embodiment. For example in FIG. 1, Order_A 100 is placed for a quantity of 30 units of the product. At reporting point A1 101, the first reporting point, the quantity of yield, scrap, and WIP equal the 30 units for the order. The quantity of yield at RP A1 101 is 24 units 111 while the quantity of scrap is 3 units 121 and the quantity of WIP is 3 units 141 totaling the 30 units for the order 100. At reporting point A2 102, the second reporting point, the quantity of yield, scrap, and WIP need to equal the 24 units of yield 111 at the preceding RP A1 according to this embodiment of the present invention. The quantity of yield at RP A2 102 is 18 units 112 while the quantity of scrap is 2 units 122 and the quantity of WIP is 4 units 142 totaling the 24 units of yield 111 at RP A1 101.

The yield quantity at the final reporting point in a production process represents the total quantity of the finished product produced so far and may be the reporting point at which the ordered goods are received. For example, the final reporting point shown in FIG. 1 is reporting point A4 104. At RP A4 104, the quantity of yield is 13 units 114 representing the total quantity of the finished product produced up to this point.

In the example shown in the embodiment in FIG. 1, an order 100, Order_A, is placed for a quantity of 30 of a product. The process for Order_A includes four reporting points in the example shown in FIG. 1. At reporting point A1 101, 24 units 111 of the product have been successfully processed and are considered yield at this reporting point. Three units 121 have been unsuccessfully processed and can't be reworked (i.e., reprocessed) and have become scrap at this reporting point. A remaining 3 units 141 of the product have yet to begin or complete the production process up to reporting point A1 and are consider WIP. Components and resources are used in the processing occurring up to RP A1 101. In the example embodiment in FIG. 1, 1 unit of component and 1 unit of resource are used per unit processed. At reporting point A1 101, the quantity of components (C1) and resources (R1) used each equal 27 units 131 for the units of yield 111 and scrap 121 that have been processed.

Of the 24 units of yield 111 at RP A1 101, 18 units 112 of the product have been successfully processed and are considered yield at reporting point A2 102. Two units 122 have been unsuccessfully processed and can't be reworked (i.e., reprocessed) and are scrap at RP A2 102. Four units 142 of the product (out of the 24 111) remain to be processed or to complete processing and are WIP at RP A2 102. The quantity of components (C2) and resources (R2) used for the processing to reporting point A2 102 each equal 20 units 132 for the units of yield 112 and scrap 122 that have been processed.

At reporting point (RP) A3 103, only 14 units 113 of the 18 units 112 of the product yielded at RP A2 102 have been successfully processed and have become yield. One unit 123 has been unsuccessfully processed and can't be reworked (i.e., reprocessed) and, therefore, is now scrap at RP A3 103. Three units 143 remain to be processed or to complete processing at RP A3 103 and are considered WIP. The quantity of components (C3) and resources (R3) used for the processing to reporting point A3 103 each equal 15 units 133 for the units of yield 113 and scrap 123 that have been processed.

Of the 14 units 113 of the product yielded (i.e., successfully processed) at RP A3 103, 13 units 114 have been successfully processed (are yield) at RP A4 104. Because RP A4 104 is the final reporting point, the 13 units 114 of yield at RP A4 104 are finished products of the process A1-A4 for Order_A 100 according to this embodiment of the present invention. There is no scrap 124 at RP A4 104 and the remaining one unit 144 is WIP at this reporting point. The quantity of components (C4) and resources (R4) used for the processing to reporting point A4 104 each equal 13 units 134 for the units of yield 114 and scrap 124 that have been processed.

According to the example depicted in FIG. 1, a quantity of 30 units 100 is ordered with 13 units 114 of final product produced at RP A4 104. The successfully processed yield throughout the process includes 24 units 111 at RP A1 101, 18 units 112 at RP A2 102, 14 units 113 at RP A3 103, and 13 units 114 at RP A4 104. Of the quantity of 30 units 100, 6 units have been unsuccessfully processed and are not capable of being reworked (i.e., reprocessed) and are considered scrap: 3 units 121 at RP A1 101, 2 units 122 at RP A2 102, 1 unit 123 at RP A3 103, and none 124 at RP A4 104. Of the quantity of 30 ordered, 11 units remain as WIP at the various reporting points: 3 units at RP A1, 4 units at RP A2, 3 units at RP A3, and 1 unit at RP A4. The example represented in FIG. 1 indicates that only the WIP remains to be processed. Yield and scrap require no further processing at the different reporting points. Therefore, only 11 units of the product (i.e., the WIP) remain to be processed: 3 units 141 at RP A1 101, 4 units 142 at RP A2 102, 3 units 143 at RP A3 103, and 1 unit 144 at RP A4 104. The final yield (i.e., the finished product) of 13, the total scrap of 6, and the total work-in-process (WIP) of 11 equal the total order quantity of 30 according to this embodiment.

Figure 2:
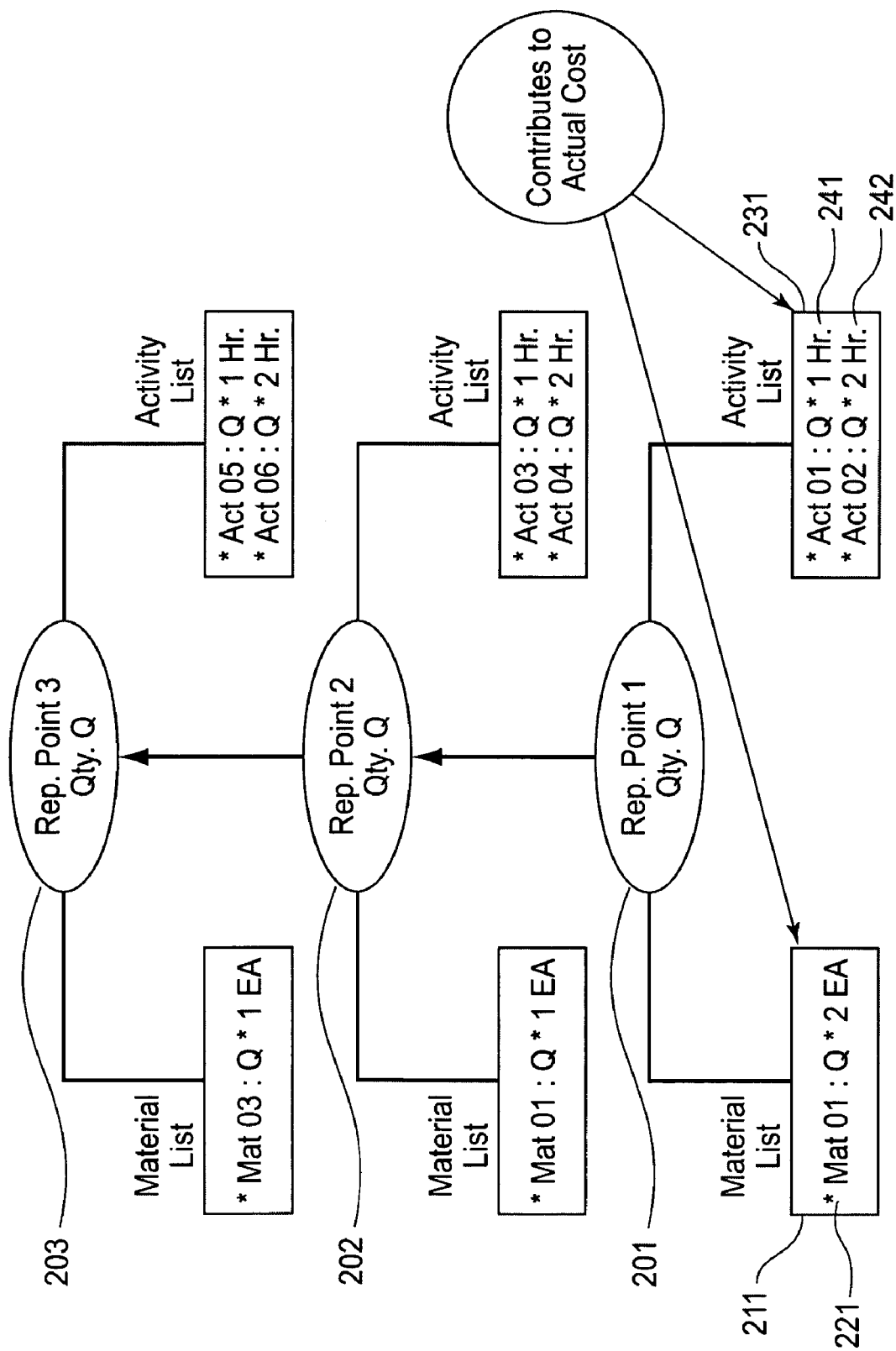
FIG. 2 is a diagram outlining how cost information is incorporated into the processing of an order according to one embodiment of the present invention.

FIG. 2 is a diagram outlining how cost information is incorporated into the processing of an order according to one embodiment of the present invention. The tracking of cost activity occurs at each reporting point 201-203 in a process for an order. The inputs in the production process may be considered components and resources in one embodiment of the present invention. The components are the physical items required for the production of the product—the material. At each reporting point in FIG. 2 the material that is used at that stage of the production process is tracked. For example, the components 211 used for the processing to reporting point 1 201 include a material "Mat 01" 221 of which a 2 units are required for each unit "Q" of the product processed. The resources are the labor, machinery, and/or other services required in the production of the product—the activity. At each reporting point in FIG. 2, the resources used at that stage of the production process is tracked. For example, the resources 231 used for the processing to reporting point 1 201 include two resources "Act 01" 241, of which 1 hour is required for each unit "Q" of the product processed, and "Act 02" 242, of which 2 hours are required for each unit "Q" of the product processed. A cost is associated with each component and resource and the quantity of each used is multiplied by this cost to determine the actual costs at each reporting point. A similar cost calculation is made at the other reporting points 202, 203 in the production process. The total cost of the order is the sum of the costs tracked at each of the reporting points.

Figure 3:
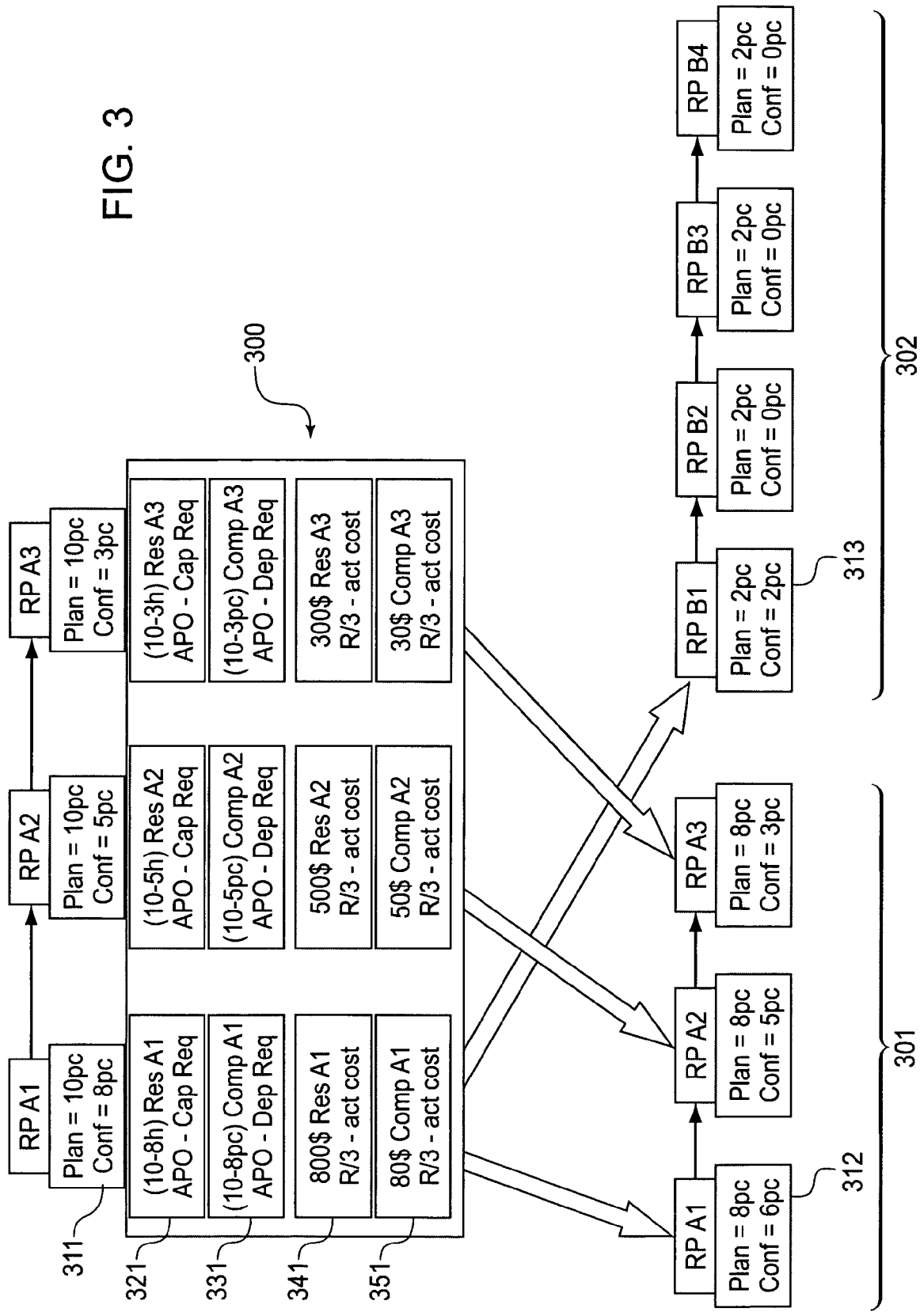
FIG. 3 is a diagram further illustrating the cost transfer during a split order transaction according to one embodiment of the present invention.

FIG. 3 is a diagram further illustrating the cost transfer during a split order transaction according to one embodiment of the present invention. The split order transaction is discussed in greater detail in "Method And System For Splitting An Order In A Flexible Order Transaction System", reference no. (11884/416501), Patent Application No. not yet assigned, filed 21 May 2003 incorporated by reference herein. A parent order 300 includes three reporting points A1-A3 and is split between the remaining parent order 301 and a child order 302. The original parent order 300 is placed for a quantity of 10 pieces (i.e., units) which is shown in FIG. 3 as the planned quantity at each of the reporting points. The post split quantity for the remaining parent order 301 is 8 units and for the child order 302 is 2 units both shown as the planned quantity at each of the reporting points for the processes associated with the orders. The confirmed quantity at each reporting point is the yield (i.e., the successfully processed quantity of the product). For example, at RP A1 in the original parent order the yield is 8 units 311 shown as "Conf=8pc" meaning confirmed quantity (i.e., yield) is 8 pieces (i.e., units). At each reporting point in the original parent order is an estimate of the resource requirements 321 and the component requirements 331 for the reporting point as well as the actual resource cost 341 and the actual component cost 351 incurred so far—as reflected by the current yield 311. For example, the estimated resource usage 321 is based on the quantity planned times the resource rate (not shown but in this case 1 hour per unit) of 10 hours minus 8 hours for the confirmed yield indicating 2 hours of estimated resource requirement remain according to one embodiment of the present invention. The estimated component requirements 331 are also based on the planned quantity times the component rate (not shown but in this case 1 piece or unit) of 10 hours minus 8 hours for the confirmed yield indicating 2 additional units of estimated component requirement remain according to one embodiment of the present invention. The actual resource costs 341 and the actual component costs 351 are based on the confirmed yield 311 at the reporting point multiplied by the resource/component used and may include cost for scrap as well (not shown). At reporting point A1, 2 units of yield 313 of the 8 units of yield 311 in the original parent order 300 are transferred to the child order 303. The remaining 6 units of yield 312 stay with the post-split parent order 302. The actual resource usage and costs 341 and component usage and cost 351 are also divided and transferred along with corresponding yield in the split transaction according to one embodiment of the present invention.

Figure 4:
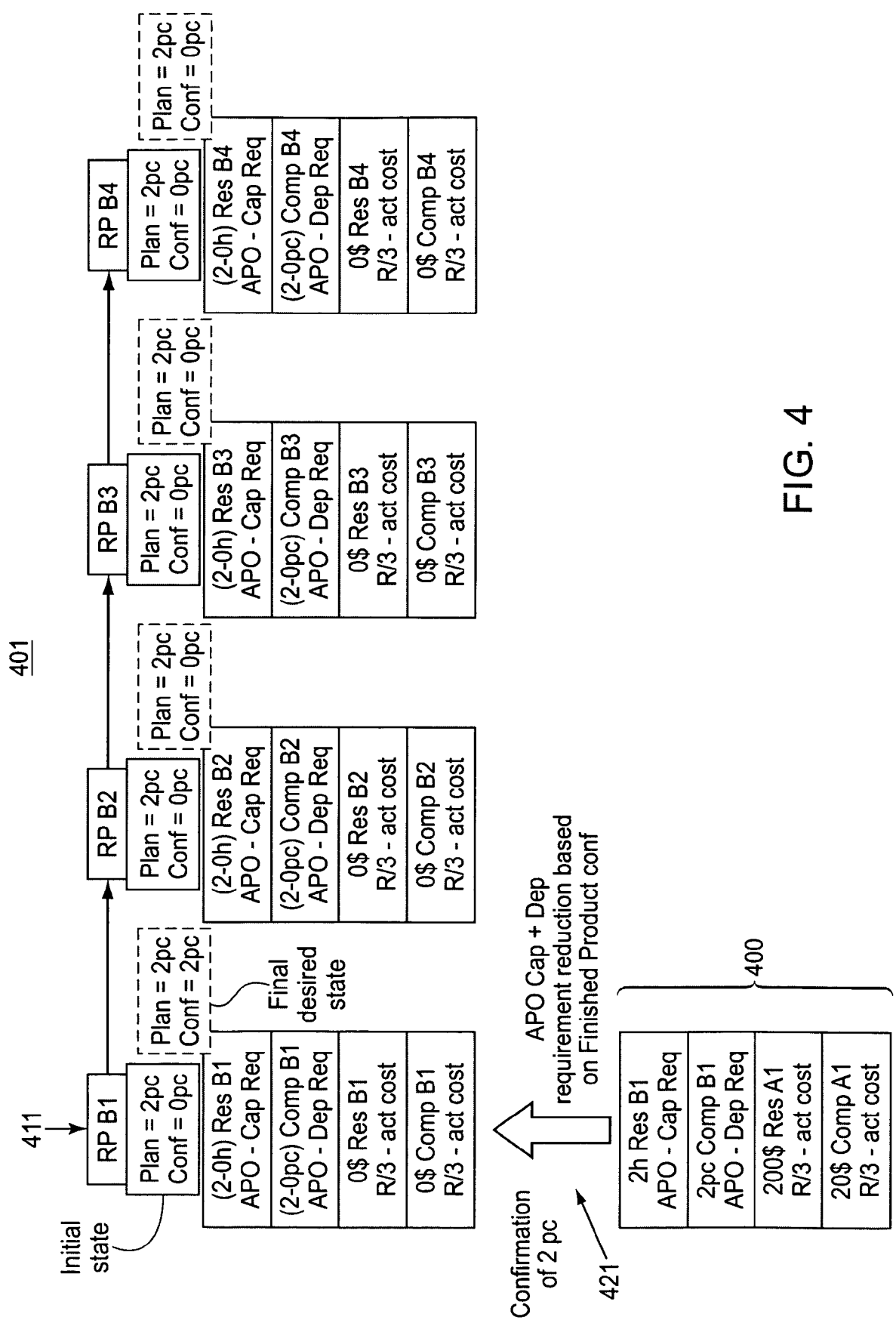
FIG. 4 is a diagram illustrating the transfer of estimated and actual resource and component usage and cost to the child order during a split order transaction according to one embodiment of the present invention.

FIG. 4 is a diagram illustrating the transfer of estimated and actual resource and component usage and cost to the child order during a split order transaction according to one embodiment of the present invention. The only transfer in the example embodiment shown in FIG. 3 occurred from RP A1 to RP B1 where 2 units of yield 313, 421 were transferred from the original parent order 400 to the child order 401. At this mapped reporting point, all the associated resource and component usage from which cost is determined is transferred to RP B1 411 as well.

Figure 5:
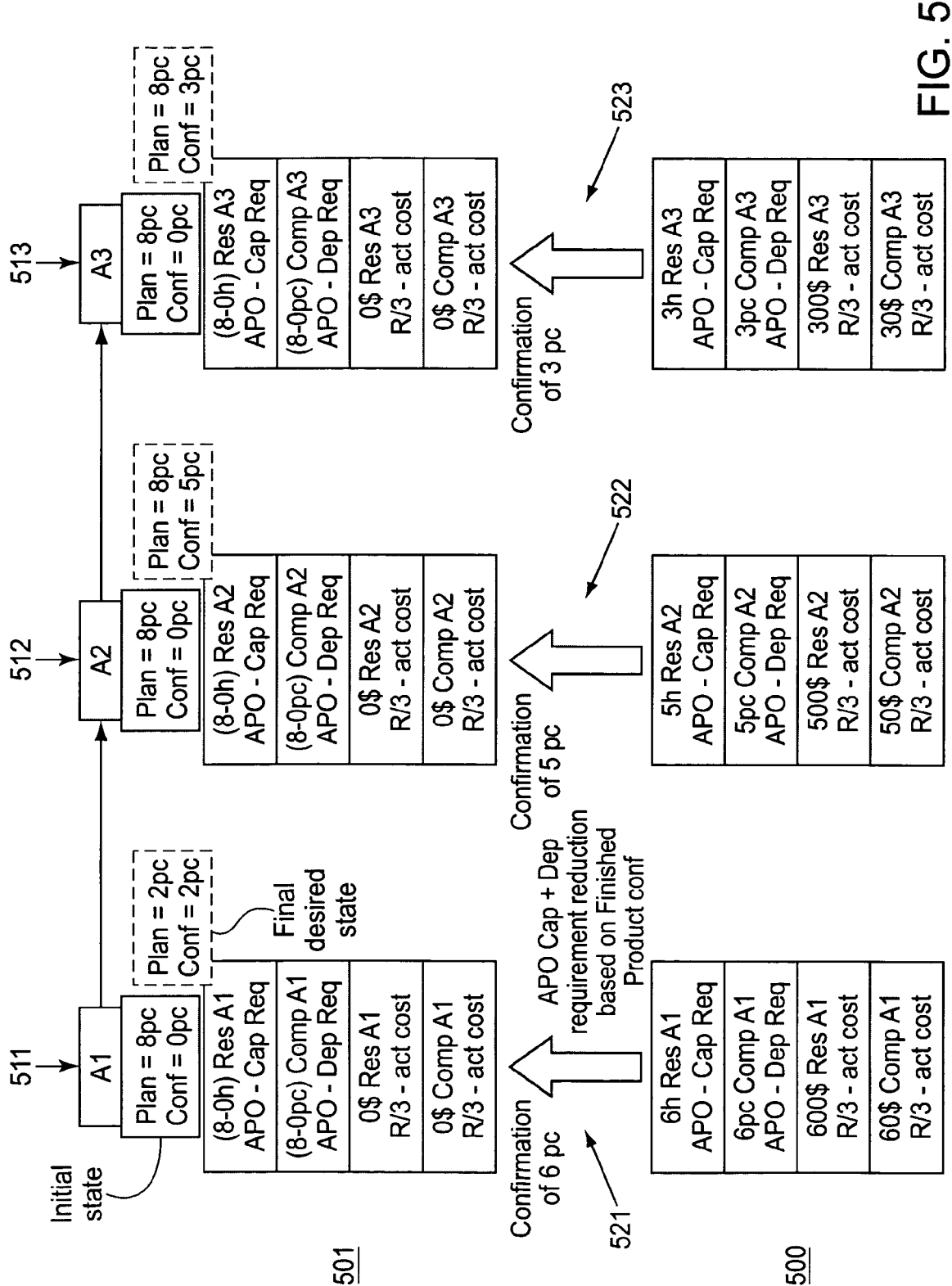
FIG. 5 is diagram illustrating the transfer of estimated and actual resource and component usage and cost to the new remaining parent order after a split order transaction according to one embodiment of the present invention.

FIG. 5 is diagram illustrating the transfer of estimated and actual resource and component usage and cost to the new remaining parent order after a split order transaction according to one embodiment of the present invention. At reporting point A1 511, 6 units of yield are transferred 521 from the original parent order 500 to the new parent order (or stay with the remaining parent order) with the associated resource and component usage and cost information transferred 521 as well. At reporting point A2, 5 units of yield are transferred 522 from the original parent order 500 to the new parent order (or stay with the remaining parent order) with the associated resource and component usage and cost information transferred 522 as well. At reporting point A3, 3 units of yield are transferred 523 from the original parent order 500 to the new parent order (or stay with the remaining parent order) with the associated resource and component usage and cost information transferred 523 as well.

Figure 6:
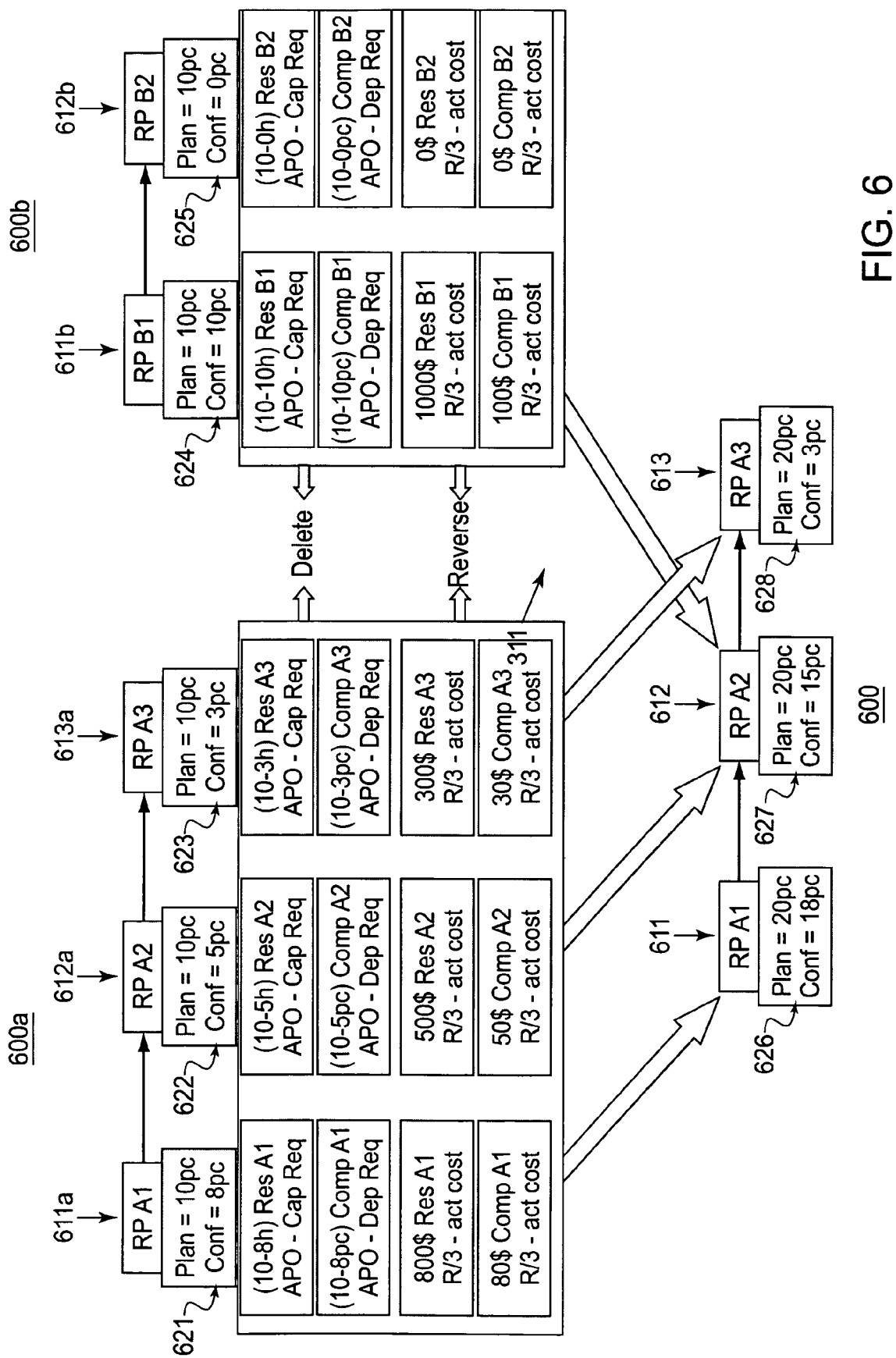
FIG. 6 is a diagram further illustrating the cost transfer during a merge orders transaction according to one embodiment of the present invention.

Cost integration also occurs for merge orders transactions in the flexible order transaction system according to one embodiment of the present invention. FIG. 6 is a diagram further illustrating the cost transfer during a merge orders transaction according to one embodiment of the present invention. The merge orders transaction is discussed in greater detail in "Method And System For Merging Orders In A Flexible Order Transaction System", reference no. (11884/416801), Patent Application No. not yet assigned, filed 21 May 2003 incorporated by reference herein. A merging order 600b includes 2 reporting points B1 611b and B2 612b and the surviving order includes 3 reporting points A1 611a, A2 612a, and A3 613a. In the example embodiment depicted in FIG. 6, a new order 600 is generated with the same processing structure as the surviving order 600a and the production from both the surviving order 600a and merging order 600b are transferred to it after which the surviving order and new order are then deleted. According to this embodiment, yield 621 from RP A1 611a and yield 624 form RP B1 611b are transferred to RP A1 611 in the new order 600 resulting in 18 units of yield. Other mappings between the reporting points are shown. In this example embodiment, the resource and component usage and cost (both estimated and actual) may also be transferred with the yield (and scrap if any exists) to the mapped reporting points in the new surviving order. The detail mapping of the costs along with the yield and scrap allows for the detailed and efficient transfer of the actual costs when merging the orders and applies the costs to the appropriate reporting points according to the existing mapping.

Figure 7:
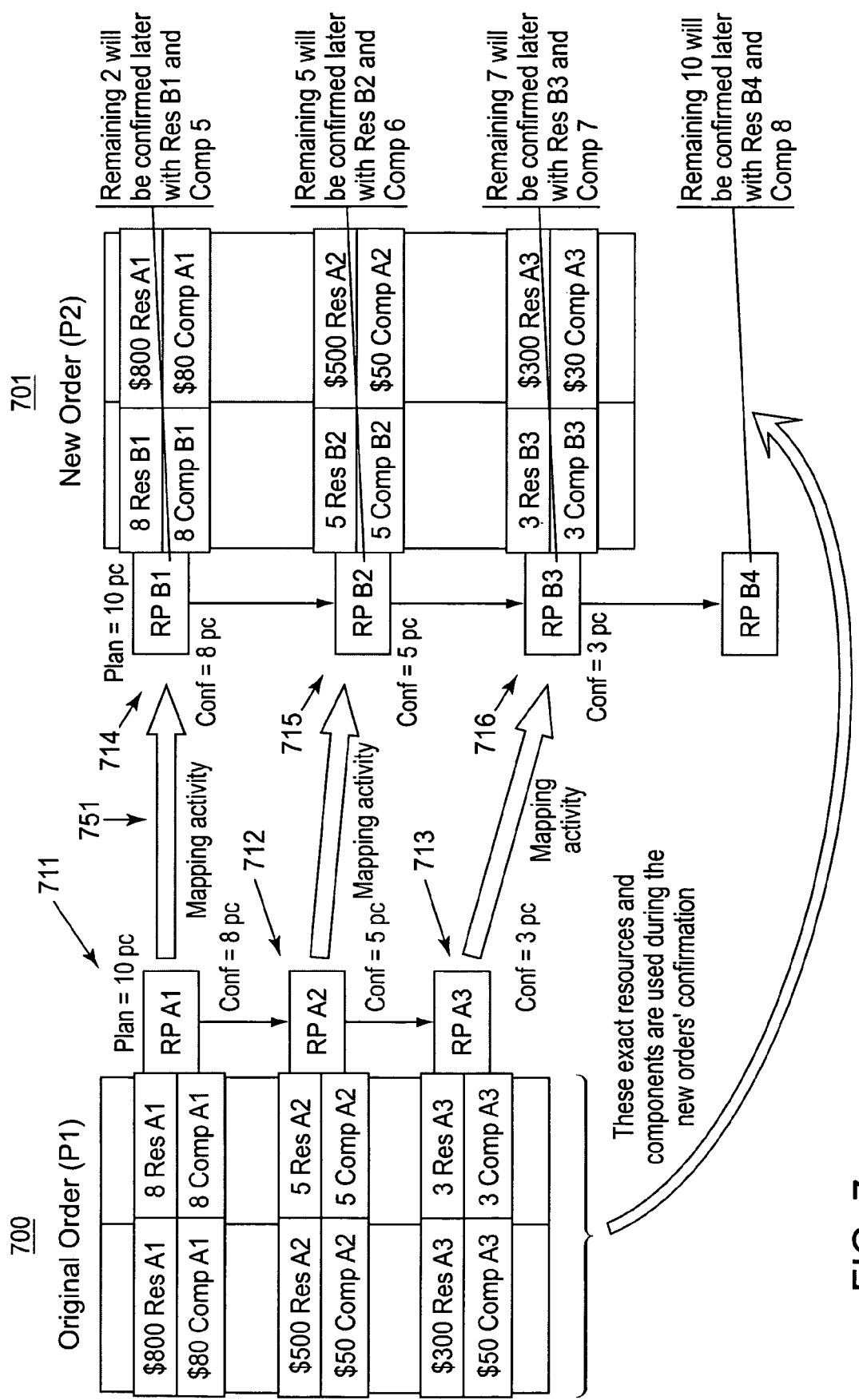
FIG. 7 is a diagram further illustrating the cost transfer during a change order or product change transaction according to one embodiment of the present invention.
Figure 8:
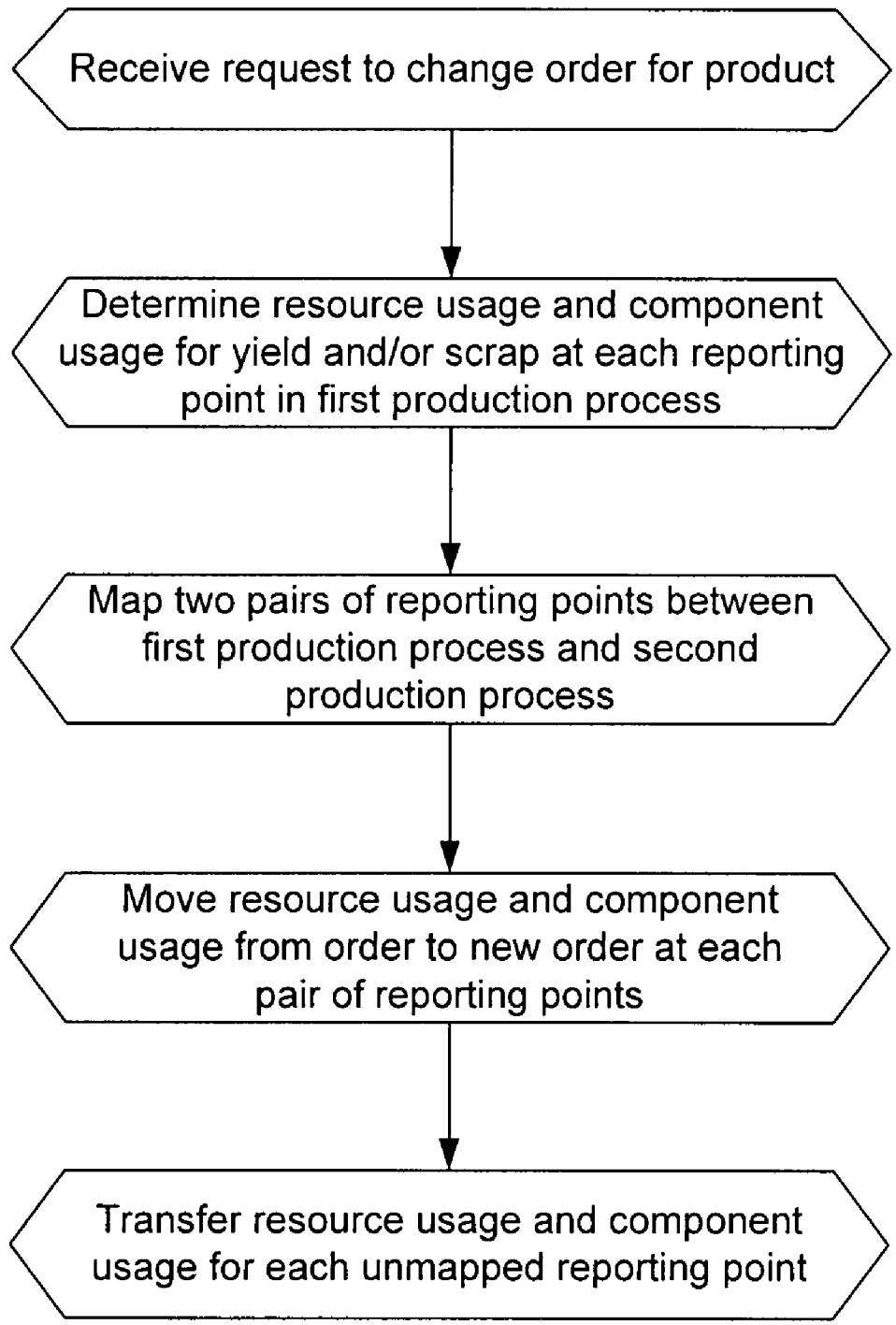
FIG. 8 is a flowchart showing a method for integrating cost during a change in an order according to an embodiment of the present invention.
Figure 9:
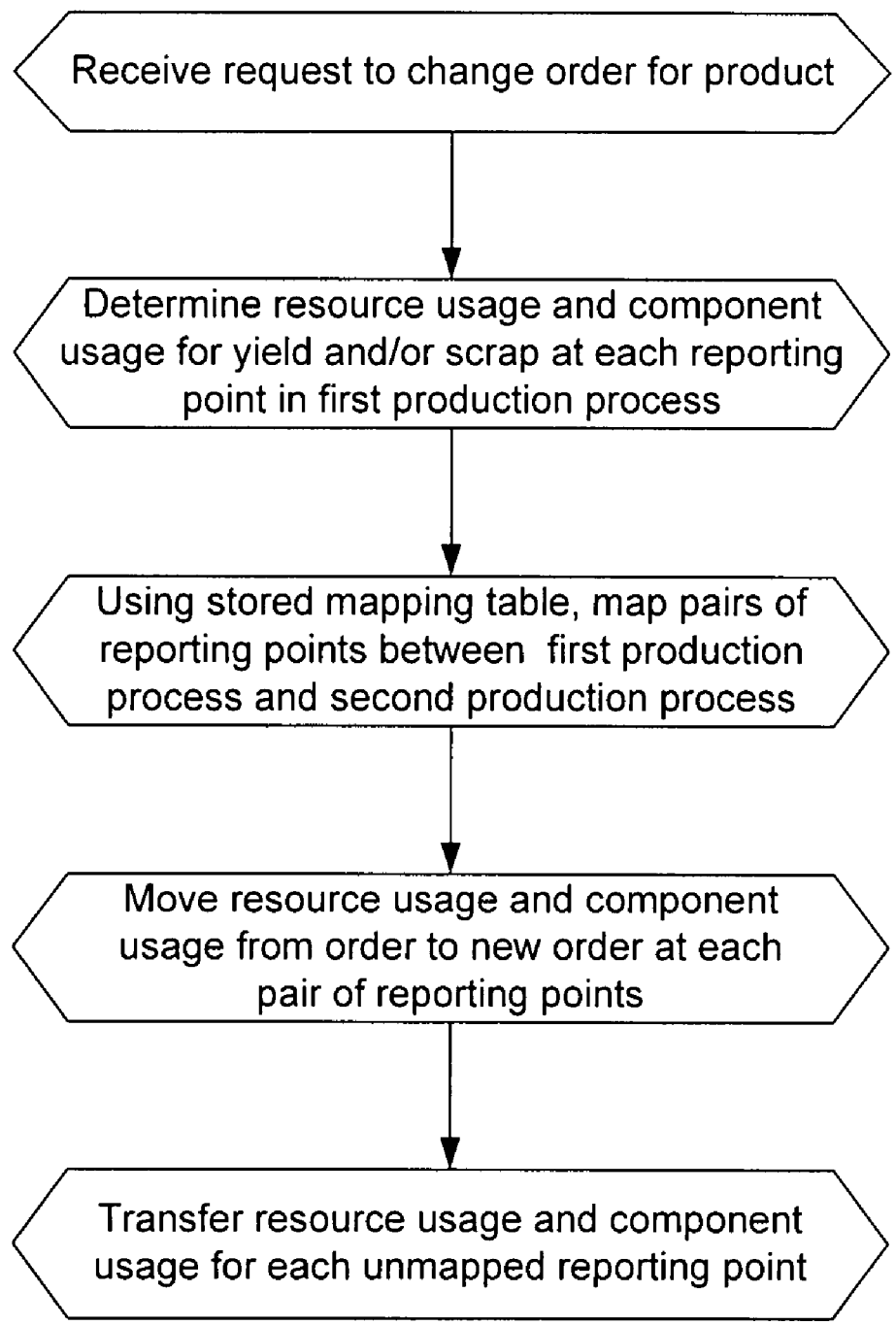
FIG. 9 is a flowchart showing a method for integrating cost during a change in an order using a stored mapping table according to an embodiment of the present invention.

Cost integration also occurs when a change order or product change transaction is implemented in the flexible order transaction system according to one embodiment of the present invention. FIG. 7 is a diagram further illustrating the cost transfer during a change order or product change transaction according to one embodiment of the present invention. The product change transaction is discussed in greater detail in "Method And System For Changing An Order In A Flexible Order Transaction System", reference no. (11884/416701), Patent Application No. not yet assigned, filed 21 May 2003 incorporated by reference herein. An original order 700 includes 3 reporting points A1 711, A2 712, and A3 713 that are mapped to reporting point B1 714, B2 715, and B3 716 respectively in the new order 701 according the depicted embodiment. At each of these mapped reporting point pairs, yield and scrap, where it exists, are transferred from the original order to the new order. Along with this mapping activity, the resource and component usage and costs associated with transferred yield and scrap are also transferred. For example, at RP A1 711, 8 units of resource usage and 8 units of component usage are transferred 751 to RP B1 714 in the new order. The detail mapping used for the product change process allows for the detailed transfer of the costs along with the yield and scrap.

The resource and component usage is also impacted by scrap at each reporting point. The preceding example embodiments showed only the transfer of yield and no scrap. Any transferred scrap also requires the transfer of its associated resource and component usage to accurately reflect cost according to one embodiment of the present invention.

In the embodiments depicted above both the resource and component usage and cost are transferred. However, only the transfer of the resource and component usage (not the cost) may be necessary because the cost can easily be calculated based on this information according to one embodiment of the present invention. Additionally, in the embodiments depicted above, both the estimated and actual resource and component information is transferred. However, only the actual resource and component usage needs to be transferred as the estimated requirements can easily be calculated from the information available according to another embodiment of the present invention.

What is claimed is:

1. A method for integrating cost during a change in an order for a product in a flexible order transaction system wherein production of the order is currently in progress, comprising the steps executed by a computer processor of:

receiving a request to change the order for the product, the change resulting in a new order;

determining a resource usage and a component usage for at least one of a yield and a scrap generated at each reporting point in a first production process for the order for the product, the first production process including a plurality of reporting points;

mapping at least two pairs of reporting points between the first production process for the order and a second production process for the new order, the second production process including a plurality of reporting points;

moving, at each mapped pair of reporting points, the resource usage and the component usage from the order to the new order; and transferring, for each unmapped reporting point in the first production process for the order, the resource usage and the component usage as a function of the mapped reporting points.

2. The method according to claim 1, wherein the order and the new order are for the manufacturing of a product.

3. The method according to claim 1, wherein the yield quantity is a quantity of the product that is successfully processed.

4. The method according to claim 1, wherein the scrap quantity is a quantity of the product that is unsuccessfully processed and can't be reprocessed.

5. The method according to claim 1, wherein the resource usage is a quantity of at least one of a service, a labor, and a machine usage used in the production of the order.

6. The method according to claim 1, wherein the component usage is a quantity of at least one of a material and a product used in the production of the order.

7. The method according to claim 1, wherein the mapping step further comprises:

mapping at least two pairs of reporting points between the first production process for the order and a second production process for a new order as a function of a mapping table, the mapping table stored as part of the flexible order system and the second production process including a plurality of reporting points.

8. The method according to claim 1, wherein the plurality of reporting points for the first production process is different than the plurality of reporting points for the second production process.

9. The method according to claim 1, wherein the first production process is different than the second production process, the second process structure including a plurality of reporting points that is different than the plurality of reporting points for the first production process.

10. The method according to claim 1, the transferring step further comprising:

transferring, for each unmapped reporting point in the first production process for the order, the resource usage and the component usage to a reporting point in the second production process for the new order as a function of the mapped reporting points using at least one of a first preceding mapped reporting point in first production process and the first reporting point in the second production process.

11. The method according to claim 1, further comprising the step of:

transferring, for each unmapped reporting point in the first production process for the order, the resource usage and the component usage to a reporting point in the second production process for the new order as a function of the mapped reporting points using at least one of a first subsequent mapped reporting point in first production process and the last reporting point in the second production process.

12. A system for integrating cost during a change in an order for a product in a flexible order transaction system wherein production of the order is currently in progress, comprising:

a program memory;

a storage device; and a processor, wherein the processor is adapted to:

(i) receive a request to change the order for the product, the change resulting in a new order, (ii) determine a resource usage and a component usage for at least one of a yield and a scrap generated at each reporting point in a first production process for the order for the product, the first production process including a plurality of reporting points, (iii) map at least two pairs of reporting points between the first production process for the order and a second production process for the new order, the second production process including a plurality of reporting points, (iv) move, at each mapped pair of reporting points, the resource usage and the component usage from the order to the new order, and (v) transfer, for each unmapped reporting point in the first production process for the order, the resource usage and the component usage as a function of the mapped reporting points.

13. The system according to claim 12, wherein the yield quantity is a quantity of the product that is successfully processed.

14. The system according to claim 12, wherein the scrap quantity is a quantity of the product that is unsuccessfully processed and can't be reprocessed.

15. The system according to claim 12, wherein the resource usage is a quantity of at least one of a service, a labor, and a machine usage used in the production of the order.

16. The system according to claim 12, wherein the component usage is a quantity of at least one of a material and a product used in the production of the order.

17. The system according to claim 12, wherein the plurality of reporting points for the first production process is different than the plurality of reporting points for the second production process.

18. The system according to claim 12, wherein the first production process is different than the second production process, the second process structure including a plurality of reporting points that is different than the plurality of reporting points for the first production process.

19. The system according to claim 12, wherein the processor is further adapted to:

transfer, for each unmapped reporting point in the first production process for the order, the resource usage and the component usage to a reporting point in the second production process for the new order as a function of the mapped reporting points using at least one of a first preceding mapped reporting point in first production process and the first reporting point in the second production process.

20. The system according to claim 12, wherein the processor is further adapted to:

transfer, for each unmapped reporting point in the first production process for the order, the resource usage and the component usage to a reporting point in the second production process for the new order as a function of the mapped reporting points using at least one of a first subsequent mapped reporting point in first production process and the last reporting point in the second production process.

21. A system for changing an order for a product in a flexible order transaction system wherein production of the order is currently in progress, comprising:
   a program memory;
   a storage device, the storage device containing a mapping table; and
   a processor, wherein the processor is adapted to:
      (i) receive a request to change the order for the product, the change resulting in a new order,
      (ii) determine a resource usage and a component usage for at least one of a yield and a scrap generated at each reporting point in a first production process for the order for the product, the first production process including a plurality of reporting points,
      (iii) map at least two pairs of reporting points between the first production process for the order and a second production process for the new order as a function of the mapping table, the mapping table stored as part of the flexible order transaction system and the second production process including a plurality of reporting points,
      (iv) move, at each mapped pair of reporting points, the resource usage and the component usage from the order to the new order, and
      (v) transfer, for each unmapped reporting point in the first production process for the order, the resource usage and the component usage as a function of the mapped reporting points.

22. A computer-readable medium containing a set of instructions adapted to be executed by a processor to implement a method changing an order for a product in a flexible order transaction system wherein production of the order is currently in progress, the method comprising the steps of:
   receiving a request to change the order for the product, the change resulting in a new order;
   determining a resource usage and a component usage for at least one of a yield and a scrap generated at each reporting point in a first production process for the order for the product, the first production process including a plurality of reporting points;
   mapping at least two pairs of reporting points between the first production process for the order and a second production process for the new order, the second production process including a plurality of reporting points;
   moving, at each mapped pair of reporting points, the resource usage and the component usage from the order to the new order; and
   transferring, for each unmapped reporting point in the first production process for the order, the resource usage and the component usage as a function of the mapped reporting points.

* * * * *